E. J. DUGAN.
TIRE ARMOR.
APPLICATION FILED DEC. 4, 1913.
1,127,744.
Patented Feb. 9, 1915.
2 SHEETS—SHEET 2.
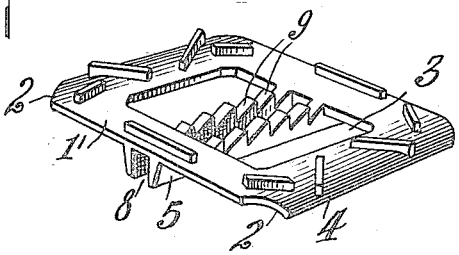
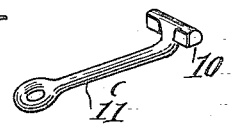
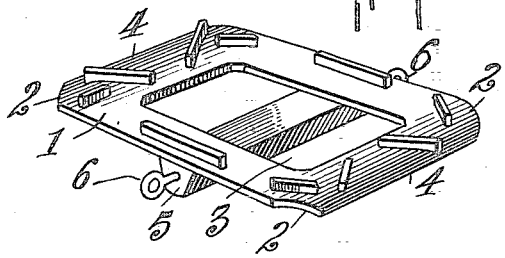
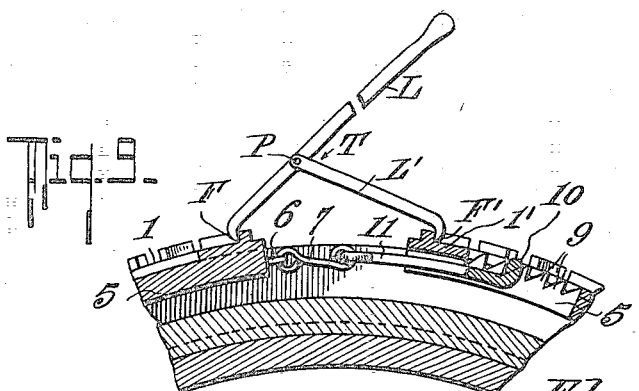
Witnesses
H. Woodard
Edward J. Dugan
By H. B. Willson &co.
Attorneys

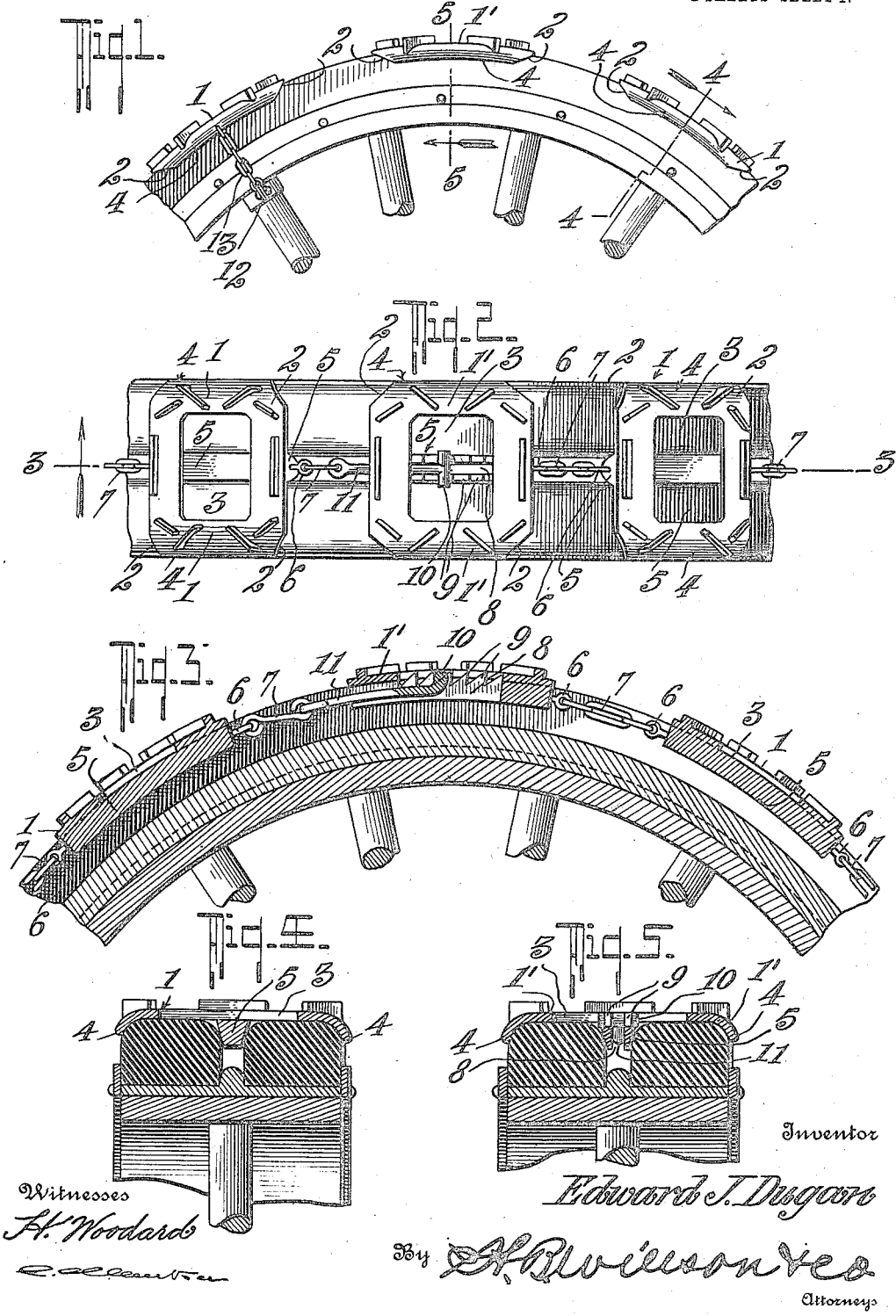

UNITED STATES PATENT OFFICE.

EDWARD J. DUGAN, OF JEANNETTE, PENNSYLVANIA.

TIRE-ARMOR.

1,127,744.          Specification of Letters Patent.      Patented Feb. 9, 1915.

Application filed December 4, 1913. Serial No. 804,707.

*To all whom it may concern:*

Be it known that I, EDWARD J. DUGAN, a citizen of the United States, residing at Jeannette, in the county of Westmoreland and State of Pennsylvania, have invented certain new and useful Improvements in Tire-Armors; and I do declare the following to be a full, clear, and exact description of the invention, such as will enable others skilled in the art to which it appertains to make and use the same.

This invention relates to improvements in tire armors and more particularly to those adapted for use with the ordinary solid rubber motor truck tire.

The primary object of the invention is to provide simple and efficient means whereby the various tread plates, forming the armor, may be held in binding contact with the tread surface of the tire.

A secondary object is to construct the above-mentioned tread plates in a manner which will obviate any danger of their injuring the outer edges of the tire.

With the above and other objects in view, the invention resides in certain novel features of construction and combination herein described and claimed, and shown in the drawings, wherein:—

Figure 1 is a side elevation of a portion of a truck wheel and tire and showing my improved armor applied. Fig. 2 is a plan view of the parts shown in Fig. 1. Fig. 3 is a vertical section on the line 3—3 of Fig. 2. Figs. 4 and 5 are transverse sections taken respectively on the lines 4—4 and 5—5 of Fig. 1. Fig. 6 is a detail perspective view of the tread plate employed at one end of the armor. Fig. 7 is a detail perspective view of the pawl which is carried by the opposite end of the armor. Fig. 8 is a detail perspective view of one of the tread plates which are employed intermediate the ends of the armor. Fig. 9 is a sectional detail showing the form of a tool which I preferably employ for drawing the meeting ends of my armor toward each other.

In the embodiment illustrated, my improved tire armor is shown as comprising, in general, a plurality of calked tread plates, flexible connections between them, and means for drawing said plates into binding contact with the tread surface of the tire.

Referring now, more particularly, to Figs. 1 to 9, inclusive, I have shown the tread plates 1 beveled on their four corners as at 2, recessed at their centers as at 3, having their opposite sides bent downwardly at 4, said plates being provided with integral depending ribs 5 on their inner faces. Eyes 6 are threaded into the adjacent ends of the ribs 5 and flexible connections 7, here shown in the form of chains, are employed between the eyes 6 for flexibly connecting the various plates 1. The armor is built up in this manner until the proper length is obtained, one endmost plate 1' having its central rib recessed as at 8 and notched on its upper edge to produce teeth 9, said teeth co-acting with a lateral head 10 on the free end of a link 11, which is loosely connected to the eye 6 carried by the tread plate at the opposite end of the armor.

The form of the invention so far described, is adapted for application to truck wheels employing a double or twin tire, the ribs 5, the chains 7, and the fastening means above described all lying within the space between the two sections of the tire.

In order to prevent any possibility of the armor creeping upon the periphery of the tire, I provide cross heads 12 carried by certain of the spokes of the wheel, said cross heads being connected with certain of the plates 1 by chains or other suitable fastenings 13.

In order to draw the adjacent ends of the armor together and thus draw the various tread plates into contact with the tread surface of the tire, to allow the fastening mechanisms, above described, to hold said adjacent ends in their retracted positions, I preferably employ the tool T shown in Fig. 9. It will be clearly seen, by reference to this figure, that the tool T comprises a lever L having an inturned foot F at its lower end and a link L' pivoted at P to the lever L, said link being provided with an inturned foot F'. The feet F and F' are adapted to engage the calks on the outer faces of the end plates of the armor to draw the same together as above described.

Although I have described my invention with considerable minuteness, I do not wish to be limited to details of construction other than those amplified in the appended claims.

Having thus described my invention, what I claim is:—

1. A tire armor comprising a plurality of tread plates having flexible connection with one another, each of said plates being designed to form substantially a rectangular frame, a longitudinal rib carried on the under face of the frame forming the tread plate, one end tread plate having the rib thereof slotted to provide a pair of bars, the upper edges of which are toothed, and means having flexible connection with the other end tread plate and adapted for engagement with the teeth on the rib of the last mentioned tread plate to adjustably secure the ends of the armor together.

2. A tire armor comprising a plurality of tread plates each consisting of a substantially rectangular frame, the sides of which are deflected downwardly and the corners of which are beveled, a longitudinal rib secured to the under face of each of said frames forming the tread plates, flexible connecting means between the ends of said ribs to secure the tread plates to one another, the longitudinal rib of one end tread plate being slotted for the greater portion of its length to form a pair of parallel bars the upper edges of which are toothed, and a link having loose connection with the rib on the other end tread plate and adapted for adjustable engagement with the teeth of the rib of the last mentioned plate, whereby to secure the ends of the armor together.

In testimony whereof I have hereunto set my hand in presence of two subscribing witnesses.

EDWARD J. DUGAN.

Witnesses:
 BERNARD DUGAN,
 FRANCES P. CURRY.